US012585893B2

(12) United States Patent
Ajagbusi

(10) Patent No.: US 12,585,893 B2
(45) Date of Patent: Mar. 24, 2026

(54) FULL MEDIA TRANSLATOR

(71) Applicant: International Business Machines Corporation, Armonk, NY (US)

(72) Inventor: Daniel Ajagbusi, Brooklyn Park, MN (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 18/334,771

(22) Filed: Jun. 14, 2023

(65) Prior Publication Data

US 2024/0419924 A1 Dec. 19, 2024

(51) Int. Cl.
| | |
|---|---|
| *G06F 40/58* | (2020.01) |
| *G06F 40/205* | (2020.01) |
| *G06F 40/242* | (2020.01) |
| *G06F 40/51* | (2020.01) |
| *G06V 30/10* | (2022.01) |

(52) U.S. Cl.
CPC ............ *G06F 40/58* (2020.01); *G06F 40/205* (2020.01); *G06F 40/242* (2020.01); *G06F 40/51* (2020.01); *G06V 30/10* (2022.01)

(58) Field of Classification Search
None
See application file for complete search history.

(56) References Cited

U.S. PATENT DOCUMENTS 8,515,728 B2 * 8/2013 Boyd ...................... G06F 40/58
704/7
10,452,787 B2 10/2019 Condie et al.

11,373,048 B2 6/2022 Liu et al.
2012/0276505 A1 * 11/2012 Al Badrashiny ..... G06F 40/253
434/167
2013/0304738 A1 * 11/2013 Johnson .................. G06F 16/48
707/E17.046
2015/0154185 A1 6/2015 Waibel
(Continued)

FOREIGN PATENT DOCUMENTS

KR 20200072616 A 6/2020

OTHER PUBLICATIONS

"Translate Images," Android—Google Translate Help, copyright 2023, Google, accessed Jun. 14, 2023, 3 pages. https://support.google.com/translate/answer/6142483?hl=en&co=GENIE.Platform%3DAndroid.=.

(Continued)

*Primary Examiner* — Daniel C Washburn
*Assistant Examiner* — Tyler Becker
(74) *Attorney, Agent, or Firm* — Yee & Associates, P.C.

(57) ABSTRACT

A computer implemented method for translating a document. A number of processor units separate the document into elements having media types. The number of processor units determine attributes for the elements. The number of processor units create a virtual map identifying relationships between the elements using the attributes. The number of processor units translate the elements into a target language based on media types for the elements. The number of processor units adjust translations for the elements based on the relationships between the elements using the virtual map to create adjusted translations for the elements. The number of processor units generate the translated document using the adjusted translations for the elements and the virtual map.

20 Claims, 14 Drawing Sheets

(56) References Cited

U.S. PATENT DOCUMENTS

| | | | |
|---|---|---|---|
| 2016/0371256 A1* | 12/2016 | Mauser | ................... G06F 40/58 |
| 2019/0340248 A1* | 11/2019 | Travieso | ............... G06F 40/205 |
| 2021/0073341 A1* | 3/2021 | Liu | .................... G06F 16/9535 |
| 2021/0141867 A1* | 5/2021 | Wason | ................. G06V 10/454 |
| 2021/0209185 A1 | 7/2021 | Travieso et al. | |
| 2021/0342556 A1* | 11/2021 | Goodman | ........... G06V 30/414 |
| 2024/0211704 A1* | 6/2024 | Griffin | ................... G06F 40/58 |

OTHER PUBLICATIONS

"Translate text from photos from English and other languages," Yandex translate, copyright 2011-2023, Yandex, accessed Jun. 14, 2023, 1 page. https://translate.yandex.com/ocr.

"WordPress Translation Plugin," Translate Press, copyright 2023, Cozmoslabs, accessed Jun. 14, 2023, 10 pages. https://translatepress.com/?utm_source=blog&utm_content=translate-website-online.

* cited by examiner

COMPUTING ENVIRONMENT
100

| Element ID 520 | Media Type 521 | Position (x, y) 522 | Associated Text 523 | Image Description 524 | Font Style 525 | Font Size 526 | Original Language 527 | Relationship ID 528 | Translated Text (no Context) 529 | Translated Text (With Context) 530 |
|---|---|---|---|---|---|---|---|---|---|---|
| 1 | Text | (100, 200) | "1. Potato Pancakes - $2.99" | | Calibri | 12 | English | 1 | "1. Kartoffelpuffer - 2,99 $" | "1. Latke - €2.75" |
| 2 | Image | (300, 500) | "1." | "Latkes, Food" | Calibri | 12 | | 1 | "1." | "1." |

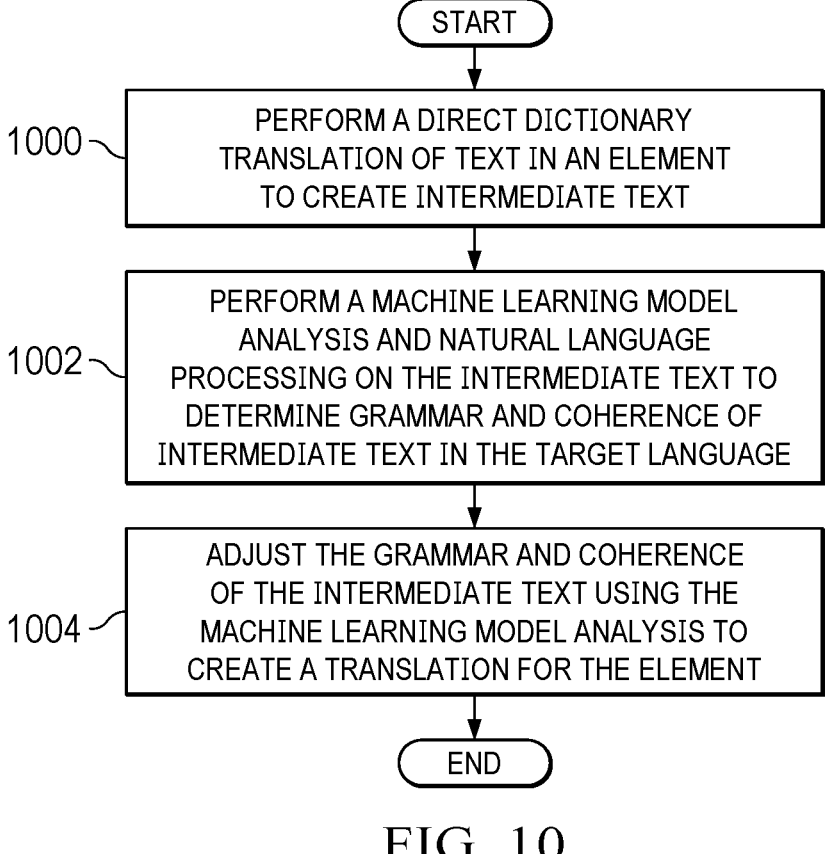

START

1000 — PERFORM A DIRECT DICTIONARY
TRANSLATION OF TEXT IN AN ELEMENT
TO CREATE INTERMEDIATE TEXT

1002 — PERFORM A MACHINE LEARNING MODEL
ANALYSIS AND NATURAL LANGUAGE
PROCESSING ON THE INTERMEDIATE TEXT TO
DETERMINE GRAMMAR AND COHERENCE OF
INTERMEDIATE TEXT IN THE TARGET LANGUAGE

1004 — ADJUST THE GRAMMAR AND COHERENCE
OF THE INTERMEDIATE TEXT USING THE
MACHINE LEARNING MODEL ANALYSIS TO
CREATE A TRANSLATION FOR THE ELEMENT

END

FIG. 10

FULL MEDIA TRANSLATOR

BACKGROUND

The disclosure relates generally to an improved computer system and more specifically to translating a document from one language into another language.

With the world becoming more interconnected, digital translators are becoming increasingly important in performing translations. Effective communication across language barriers is important. Communications can be made without users having to speak the language used by target audiences. Many websites have an ability to select from different language options and the website in the selected language.

Further, digital translators are available in different forms such as standalone devices, mobile applications, and online platforms. These digital translators can be used to translate documents, webpages, instant messages, and other types of content. Further, digital translators have become invaluable for travelers, people learning languages, and for other uses.

Digital translators use various algorithms and databases to convert text or speech from one language to another language. For example, digital translators can use statistical machine translation, neural machine translation, machine learning models, and other types of translations from one language to another language. These digital translators can be applied to translate both text and speech.

SUMMARY

According to one illustrative embodiment, a computer implemented method translates a document. A number of processor units separate the document into elements having media types. The number of processor units determine attributes for the elements. The number of processor units create a virtual map identifying relationships between the elements using the attributes. The number of processor units translate the elements into a target language based on media types for the elements. The number of processor units adjust translations for the elements based on the relationships between the elements using the virtual map to create adjusted translations for the elements. The number of processor units generate the translated document using the adjusted translations for the elements and the virtual map. According to other illustrative embodiments, a computer system and a computer program product for translating a document are provided.

BRIEF DESCRIPTION OF THE DRAWINGS

FIG. 10 is a flowchart of a process for translating a text element in accordance with an illustrative embodiment;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
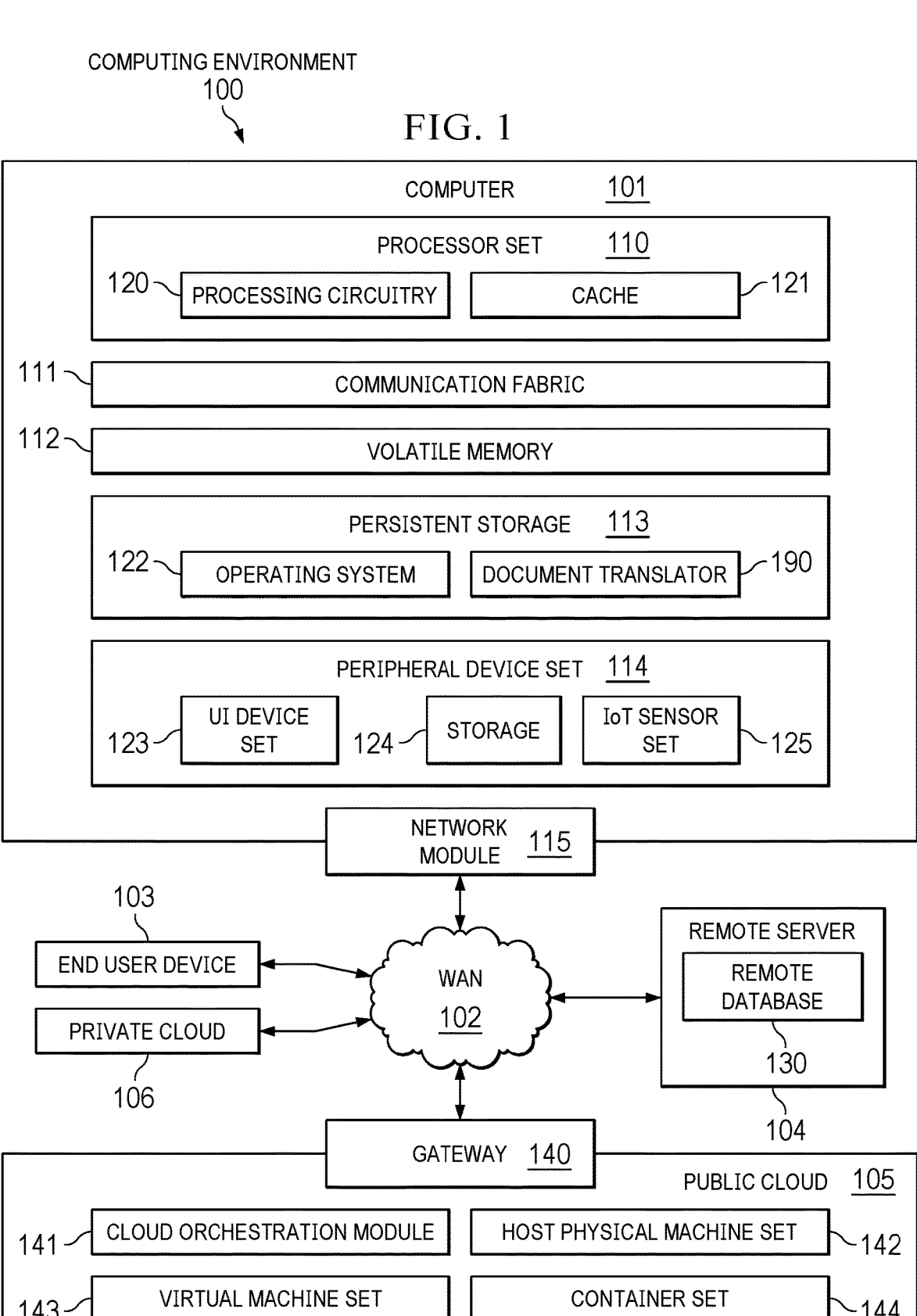
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as document translator 190. In addition to document translator 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and document translator 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in document translator 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in document translator 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Illustrative examples recognize and take into account a number of different considerations as described herein. For example, digital translators are useful but different media requires different types of digital translators. Currently, the different digital translators are separate from one another. As result, attempting to translate a document such as a webpage using different types of media can result in a frustrating and undesirable experience for user.

Thus, the illustrative examples use different digital translation techniques in a system to translate the different types of elements from one language to another language. These elements can be of the same or different types of media. An analysis of the different elements is performed to determine attributes for the elements in a document. A virtual map is created to store relationships between the different elements. Translations are performed on the elements and the virtual map is used to determine what adjustments, if any, are needed to obtain a desired level of coherency between the media appointments for a translated document. The virtual map is used to generate the translated documents with translated elements having the original positions and styles from the original document.

Figure 2:
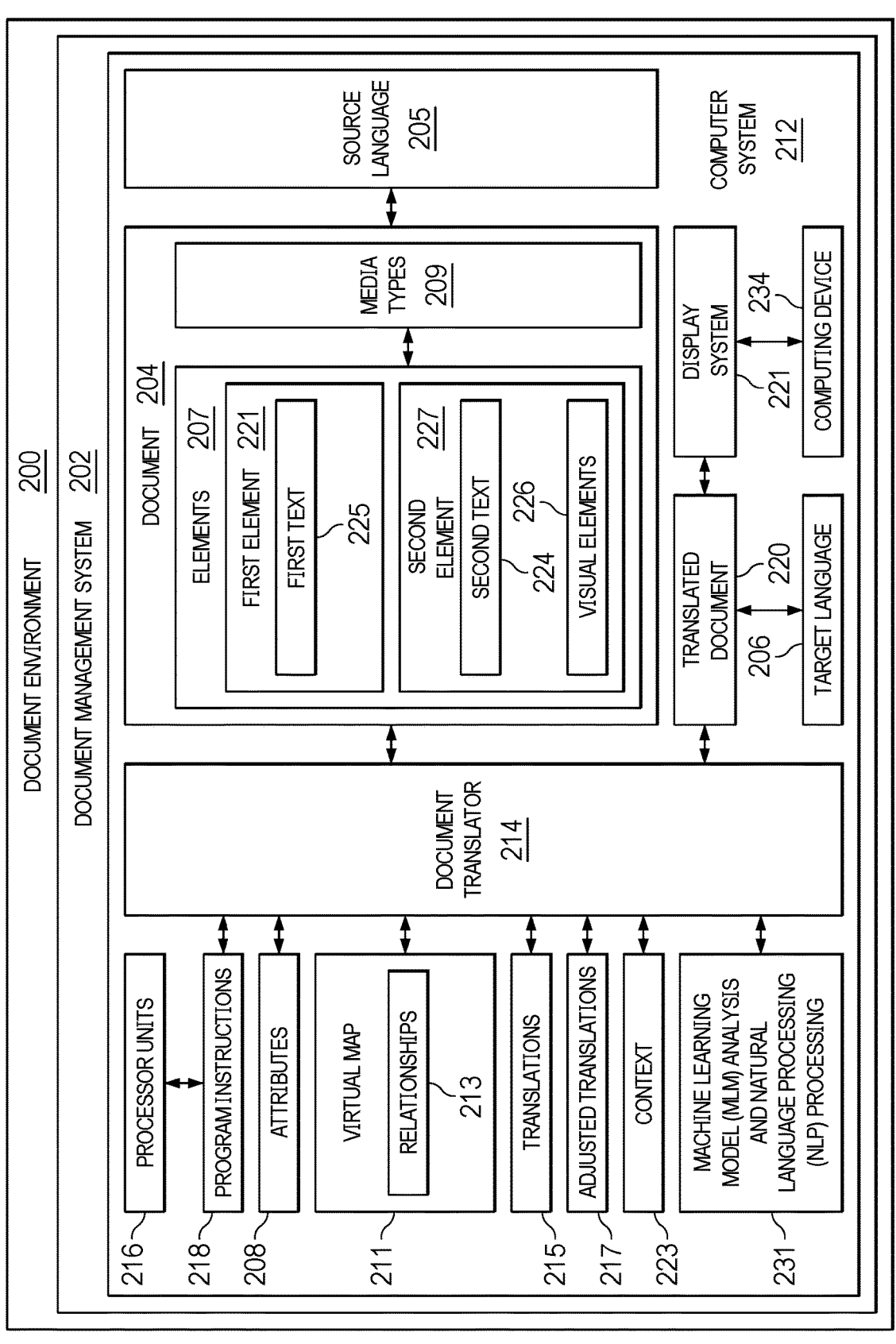
FIG. 2 is a block diagram of a document environment in accordance with an illustrative embodiment.

With reference now to FIG. 2, a block diagram of a document environment is depicted in accordance with an illustrative embodiment. In this illustrative example, document environment 200 includes components that can be implemented in hardware such as the hardware shown in computing environment 100 in FIG. 1.

Document management system 202 can be used to manage document 204. For example, document management system 202 can translate document 204 into different languages. In this illustrative example, document 204 can take a number of different forms. For example, document 204 can be a webpage, a mobile application page, an application page, a slide deck, a presentation, and other suitable types of documents.

In this illustrative example, document management system 202 comprises computer system 212 and document translator 214. Document translator 214 can be implemented in software, hardware, firmware or a combination thereof. When software is used, the operations performed by document translator 214 can be implemented in program instructions configured to run on hardware, such as a processor unit. When firmware is used, the operations performed by document translator 214 can be implemented in program instructions and data and stored in persistent memory to run on a processor unit. When hardware is employed, the hardware can include circuits that operate to perform the operations in document translator 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means a group of one or more items. For example, "a number of operations" is a group of one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this example, document 204 can be displayed on display system 221 and selected for translation. Document translator 214 translates document 204 from source language 205 to target language 206 in response to selection of document 204 for translation. In performing the translation, document translator 214 separates document 204 into elements 207. Elements 207 have media types 209, in this example. These media types can be at least one of text, image, audio, video, or other suitable types of media.

In this illustrative example, document translator 214 determines attributes 208 for elements 207 in document 204. Document translator 214 creates virtual map 211 identifying relationships 213 between the elements 207 using attributes 208. Attributes 208 can be for example, media type, position in the document 204, text, font style, font size, original language and other information about elements 207.

Document translator 214 translates the elements 207 into target language 206 based on media types 209 for elements 207. In this example, document translator 214 adjusts translations 215 for elements 207 based on relationships 213 between elements 207 using the virtual map. This adjustment creates adjusted translations 217 for elements 207.

These adjustments can be made to provide coherency between translated text in adjusted translations 217. For example, the word "bank" in English can be "bank" or "ufer" in German. With this example, "bank" in German is a financial institution while "ufer" is a bank such as a shore or an area of land along the edge of a body of water.

Adjustments can be made such that adjusted translations 217 use the same term. For example, when document 204 is related financial transactions, then the translation of "bank" from English to German should be "bank" and not "ufer" in this example.

In one illustrative example, this type of adjustment can be performed by document translator 214 from determining context 223 for elements 207 in document 204. In this example, context 223 can be determined by performing machine learning model (MLM) analysis and natural language processing (NLP) 231 on text in elements 207. For example, text in elements 207 can be analyzed to obtain context 223 of the text. With this example, a sentence in text in an element is as follows: "check deposits can be made at the banks." This text discusses financial transactions using the term "bank." Machine learning model analysis and natural process language processing 231 can determine that the context is of bank is financial institutions.

In addition, machine learning model analysis and natural language processing 231 can be performed on other media such as images in elements 207 to identify context 223. For example, in other examples, context 223 identified for one element can be applied to another element in elements 207 through the use of virtual map 211. Context 223, determined by analyzing an image in one element, can be applied to other elements using the relationship of the element with the image to in other elements using relationships 213 between elements 207 identified in virtual map 211.

In one example, document translator 214 can determine context 223 for first text in first element 221 from second text 224 and a set of visual elements 226 in second element 227 using a relationship between first element 221 and second element 227. With this example, context 223 can be identified using visual elements 226 and second text 224 in second element 227. The relationship between first element 221 in second element 227 identified in virtual map 211 can be used to apply context 223 determined for second element 227 to text in first element 221. Document translator 214 can adjust translations 215 for first element 221 using context 223.

For example, first text 225 in first element 221 can include the text "1 bank". In this example, second element 227 includes an image that with second text 224 in the image that is "1" and a set of visual elements 226 depicting a financial institution. With "1" being present in both elements, virtual map 211 can indicate the relationship is present between these two elements because of the presence of "1" in first text 225 for first element 221 and second text 224 per second element 227.

From this relationship, context 223 for second element 227 can be can a financial institution rather than a shore of a body of water using the visual element showing a financial institution. This context can be used to make adjustments for coherency between translations 215 in elements 207.

Document translator 214 generates translated document 220 using adjusted translations 217 for elements 207. Translated document 220 can be displayed on display system 234. Display system 234 can be a display system for computing device 233 in computer system 212. Computing device 233 can be, for example, a laptop computer, a smart phone, a smartwatch, a tablet computer, a desktop computer, a kiosk, a point-of-sale system, a ticketing kiosk, or some other suitable type of computing device. This translation of document 204 can be performed by document translator 214 in real time as document 204 is displayed on display system 221.

Further, document translator 214 can create virtual map 250 for use in performing translations in a manner that increases coherency between translations performed for elements 207. For example, document translator 214 can analyze translated text in first element 207 with respect to a translated image in second element 227 to create an analysis. Document translator 214 creates virtual map 250 for translated text with respect to the translated image using the analysis.

In this example, document translator 214 determines whether translated text and the translated image element are coherent with each other using virtual map 250. For example, text in translated text can be mapped with text in translated image. This mapping can be used to perform an analysis to determine whether the same text in the different elements are coherent. In other words, the analysis can determine whether the text in the target language provides an ability to understand the intended meaning from the text in the source language.

In one illustrative example, one or more technical solutions are present that overcome a problem with translating documents from one language to another language that have different types of media. As a result, one or more solutions provide a seamless translation of text contained within different types of media on a page. The translation can be performed for text in media such as images, videos, as well as overlay or on-screen text. One or more solutions provides an ability to obtain a translation of a document in which coherency is present between different elements in the translated document.

Computer system 212 can be configured to perform at least one of the steps, operations, or actions described in the different illustrative examples using software, hardware, firmware or a combination thereof. As a result, computer system 212 operates as a special purpose computer system in which document translator 214 in computer system 212 enables translating a document with multiple types of elements. In particular, document translator 214 transforms computer system 212 into a special purpose computer system as compared to currently available general computer systems that do not have document translator 214.

In the illustrative example, the use of document translator 214 in computer system 212 integrates processes into a practical application for translating a document having different types of elements. In other words, document translator 214 in computer system 212 is directed to a practical application of processes integrated into document translator 214 in computer system 212 that identifies elements in a document and translates those elements. These translations can be performed taking into account the context in different elements. Further, a virtual map can be used to identify elements that are related to each other.

The illustration of document environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
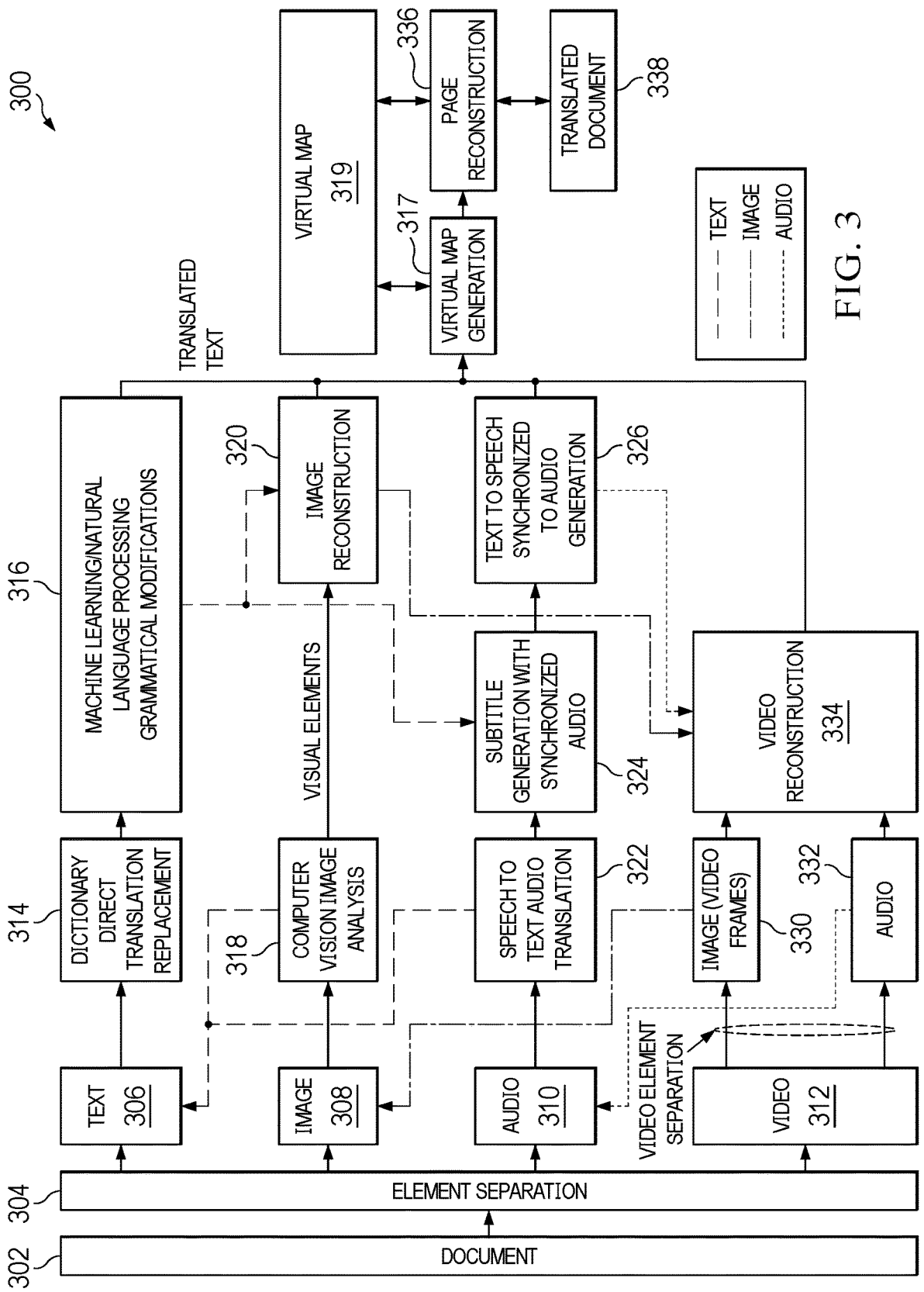
FIG. 3 is a diagram illustrating dataflow in translating elements in accordance with an illustrative embodiment.

Turning next to FIG. 3, a diagram illustrating dataflow in translating elements is depicted in accordance with an illustrative embodiment. In the illustrative examples, the same reference numeral may be used in more than one figure. This reuse of a reference numeral in different figures represents the same element in the different figures. Dataflow 300 is an example of dataflow that can be implemented in document translator 214 to translate documents to a target language.

In this example, document 302 is received for translation to a target language. The document can be in one or more source languages. In this example, element separation 304 is performed to separate document 302 into elements for translation. In this example, element separation 304 can result in elements of different types of media. In this example, document 302 can be separated into elements such as text 306, image 308, audio 310, and video 312.

In this example, text 306 can be translated using dictionary direct translation replacement 314. This type of translation involves looking up individual words in one or more dictionaries and replacing those words with the corresponding words in the target language. This type of translation does not take into account grammar rules, word order, and idiomatic expressions that may differ from language to language. This translated text is intermediate translated text.

Next, machine learning and natural language processing grammatical modifications 316 are performed on the intermediate translated text received from dictionary direct translation replacement 314. These types of modifications can be performed using machine learning model analysis and natural language processing 231 on intermediate translated text to determine grammar and coherence of this translated text in the target language. The machine learning model analysis can be performed using machine learning models such as neural machine translation (NMT) models that employ deep learning techniques to translate checks from one language to another language. These types of models can be used to refine the intermediate translated text obtained from direct dictionary translations. These two types of techniques can be used to perform translations of dictionary translated text using statistical machine translation (STM). Natural language processing techniques can be used improve machine learning models to improve the translation process. These techniques can be used to increase linguistic knowledge and improve the quality and fluency of translations performed using the machine learning model.

Thus, machine learning and natural language processing grammatical modifications 316 can make changes to the intermediate translated text based on grammar rules, word order, and idiomatic expressions in the intermediate translated text that are needed for this text to have the intended meaning in the target language. This translated text can be sent to virtual map generation 317 and used by virtual map generation 317 to create a virtual map of the elements in document 302.

In this example, image 308 is another example of an element that can be processed for translation. Image 308 can be processed using computer vision image analysis 318 to separate text from visual elements in image 308. In this illustrative example, computer vision image analysis 318 can include optical character recognition that analyzes pixel patterns and converts the text in the image into machine readable text. This machine readable text is text 306 that can be translated as described above.

In this example, the visual elements are sent to image reconstruction 320. Additionally, the translated text obtained from image 308 is also sent to image reconstruction 320.

Image reconstruction 320 reconstructs image 308 using the translated text and visual elements. As result, image 308 can be reconstructed in the target language. In this example, image reconstruction 320 can place the text with the same font type, font size, and position within image 308 with respect to the visual elements from image 308. Additionally, the translated text and the placement of visual elements in the reconstructed image can be sent to virtual map generation 317 for identifying attributes used in virtual map 319 of the different elements in document 302.

In this illustrative example, audio 310 can be processed using speech to text audio translation 322 to generate text 306 for the translation. The translated text can be used to generate subtitles in subtitle generation with synchronized audio 324. Text-to-speech synchronized audio generation 326 can be used to generate the speech in the target language in the audio. In this example, either or both subtitles and speech can be generated from the translated text for use in re-creating the audio. The results can be sent to virtual map generation 317 for use in determining attributes for the translated audio for virtual map 319.

In a similar fashion, video 312 can be processed to separate video into image video frames 330 and audio 332. In this example, each image video frames 330 is an image such as image 308 for processing in dataflow 300. Audio 332 is processed as audio 310. With this type of processing, the reconstructed image for each of the video frames is generated by image reconstruction 320 using translated text identified in the video frames. Reconstructed images are sent to video reconstruction 334, in which the different frames are used to reconstruct the video.

When audio is present in video 312, subtitles, speech, or both can be received and used by video reconstruction 334 to reconstruct the video in the target language. This translated video is sent to virtual map generation 317 for analysis to identify attributes used to generate virtual map 319.

In this illustrative example, virtual map 319 is used by page reconstruction 336 to reconstruct document 302 as translated document 338. In this example, virtual map 319 provides information used to place the different translated elements into the correct positions, using fonts and other graphics that provide the same look as document 302 with text and audio in the target language.

Figure 4:
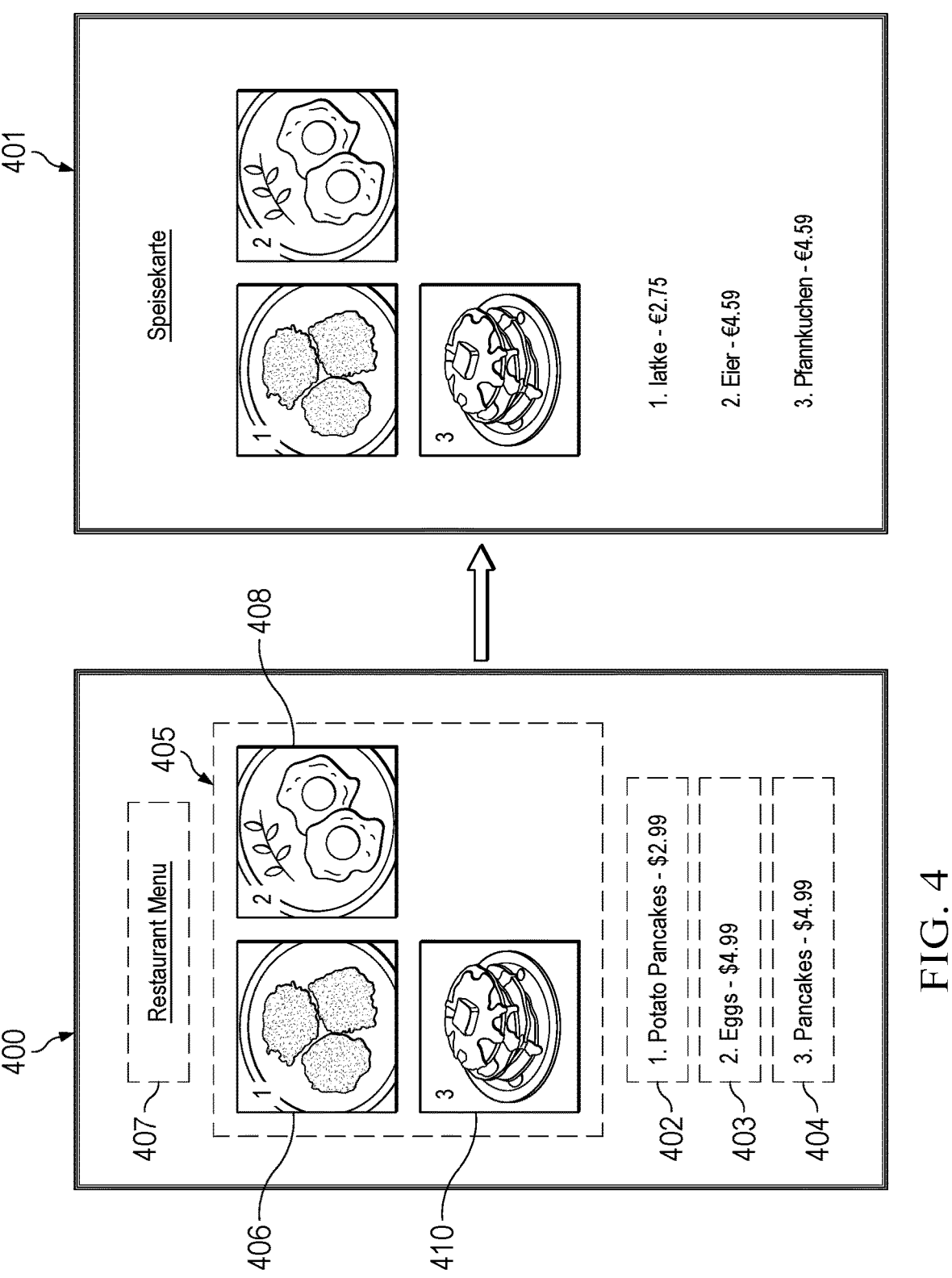
FIG. 4 is an illustration of document translation in accordance with an illustrative embodiment.

With reference next to FIG. 4, an illustration of document translation is depicted in accordance with an illustrative embodiment. In this illustrative example, webpage 400 is an example of a document for translation to a target language. Webpage 400 is an example of an implementation for document 204 in FIG. 2. In this example, webpage 400 is in English and translated webpage 401 resulting from the translation of webpage 400 is in German as a target language.

As depicted, webpage 400 can be analyzed to identify elements within webpage 400. In this example, webpage 400 includes elements in the form of text in section 407, section 402, section 403, and section 404, and images in section 405. In this illustrative example, text is also present in image 406, image 408, and image 410 in section 405 in webpage 400.

In this illustrative example, image 406 is as a visual element of potato pancakes and "1" as text in this image. Next, "2" is the text present with a visual element in the form of eggs in image 408, and "3" is the text present with a visual element of pancakes in image 410. The text in these images is not in the computer readable form but can be processed through optical character recognition to create text in a machine readable form that can be processed.

In this illustrative example, webpage 400 can be analyzed to determine context for use in translating webpage 400 to create translated webpage 401. The context can be made by analyzing the images, the text in the images along with the text in section 404. As depicted, section has the following text "1. Potato Pancakes—$2.99;" "2. Eggs—$4.99;" and "3. Pancakes—$4.99." As depicted, "1," "2," and "3." found in both the text in section 404 and in the images. In this example, these numbers can be used to establish relationships between the text and the images. This type of relationship as well as other attributes can be placed into a virtual map. This virtual map can be used to perform the translation that creates translated webpage 401.

The virtual map is used to re-create webpage 400 as translated webpage for one that has the same look as webpage 400 except for the content. In this example, the translation results in placement of the images in the same positions and locations identified for these images in the virtual map. Additionally, the font size, font type, and other attributes of these elements can be reproduced with the use of the virtual map.

Figure 5:
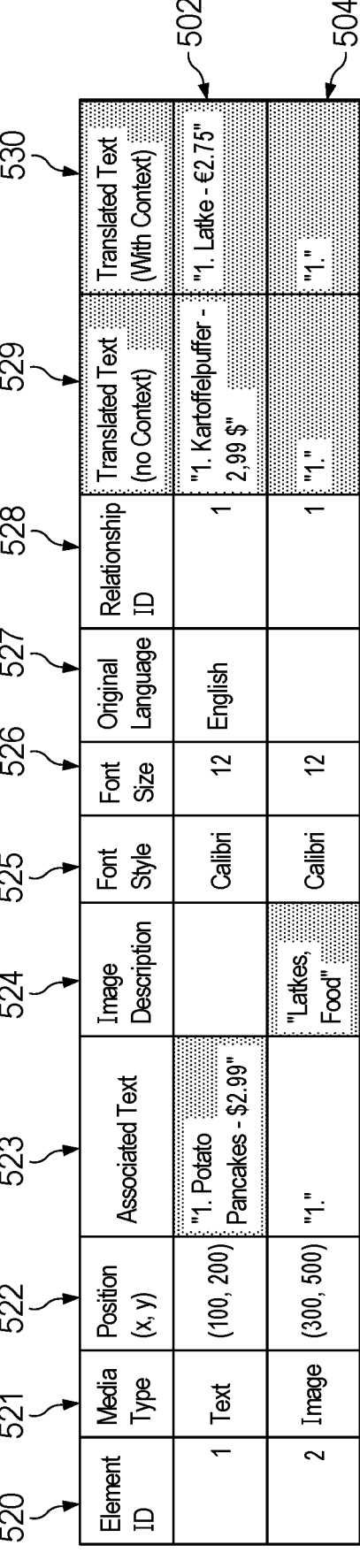
FIG. 5 is an illustration of a virtual map in accordance with an illustrative embodiment.

With reference now to FIG. 5, an illustration of a virtual map is depicted in accordance with an illustrative embodiment. In this example, virtual map 500 is an example of an implementation for virtual map 211 in FIG. 2.

In this illustrative example, virtual map 500 is in the form of a table and illustrates some entries for virtual map that can be used to create translated webpage 401 from translated elements in webpage 400 in FIG. 4. In this example, virtual map 500 includes two rows. Row 502 contains information for text in section 402 in webpage 400 in FIG. 4. Row 504 contains information for image 406 in webpage 400 in FIG. 4.

In this illustrative example, attributes in virtual map 500 are examples of some attributes that can be used in a virtual map. As depicted, virtual map 500 includes element identifier 520, media type 521, position 522, associated text 523, image description 524, font style 525, font size 526, original language 527, relationship identifier 528, translated text (no context) 529, and translated text (with context) 530.

In this example, element identifier 520 is a unique identifier that uniquely identifies an element within a document. Media type 521 indicates the media type or an element. For example, media type 521 can indicate whether the element is text, image, audio, video, or some other type of media.

Associated text 523 identifies the text in the media type. For example, in an image containing pixels for "1", this "1" in the image can be considered associated text for that element even though the "1" is not machine readable. Image description 524 is a description for images and frames in videos. The image description can be obtained from computer vision techniques or object recognition processes. In this example, image description 524 for image 406 in row 504 is "Latkes, Food."

In virtual map 500, font style 525 and font size 526 identify attributes of the text in the elements. Original language 527 identifies the source language for the document being translated. Relationship identifier 528 is an identifier used with elements that have relationships to each other. In this example, text in section 402 and image 406 are considered to have a relationship with each other because both of these elements include the text "1."

Translated text (no context) 529 is a dictionary translation without taking into account context. Translated text (with context) 530 is text generated from making adjustments to take into account the context.

The illustration virtual map 500 is an example of one implementation for a virtual map. Virtual map 500 only depicts two rows for purposes of describing an illustrative example. Other virtual maps can include additional rows to describe attributes for other elements. Additionally, other virtual maps can include other attributes such as position. This position can be used to place elements in the translated document to provide the same look for a translated document as the original document. As another example, translated text (no context) 529, and translated text (with context) 530 are optional columns. The translated text with and without context can be stored in other data structures in other examples.

Figure 6:
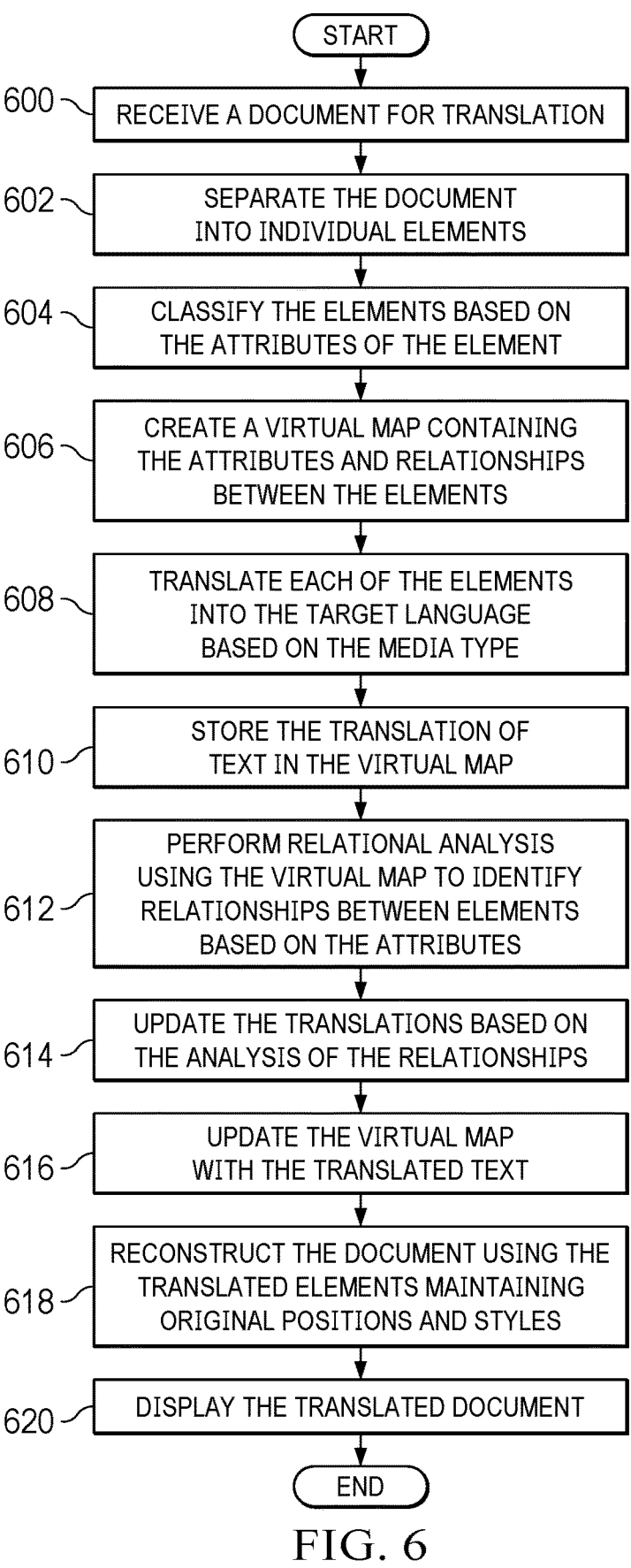
FIG. 6 is a flowchart of a process for translating a document in accordance with an illustrative embodiment.

With reference to FIG. 6, a flowchart of a process for translating a document is depicted in accordance with an illustrative embodiment. The process in this example can be implemented in hardware, software, or both. When implemented in software, the process can take the form of program instructions that are run by one of more processor units located in one or more hardware devices in one or more computer systems. For example, the process can be implemented in document translator 214 in computer system 212 in FIG. 2.

The process begins by receiving a document for translation (step 600). In step 600, the document can be, for example, a webpage, a mobile application display, or some other suitable type of document. In this example, the document can be displayed on a computing device to a user.

The process separates the document into individual elements (step 602). In this example, the elements can be text elements, image elements, audio elements, and video elements. On or more of these types of elements can be present in the document. The process classifies the elements based on the attributes of the elements (step 604). The process creates a virtual map containing the attributes and relationships between the elements (step 606). Virtual map 500 in FIG. 5 is an example of the virtual map that can be created based on the analysis of the elements.

The process translates each of the elements into the target language based on the media type (step 608). The process stores the translation of text in the virtual map (step 610). In step 610, the text has not yet been analyzed based on context.

The process performs relational analysis using the virtual map to identify relationships between elements based on the attributes (step 612). The analysis can be used to determine context for particular words in the text. The context can be determined in a number of different ways. For example, the context can be based on visual elements associated with the text and images. The context also be determined from usage and sentences and phrases in the text. This analysis can determine whether the translations are coherent and provide the intended meaning based on the context identified for the text.

In step 612, a sentence can have two words share the same spelling but have different meanings. With this example, other associated media elements may not be present to aid in determining the context for these two words. With this example, context phrasing of the two words in the sentence can be analyzed to determine the context for correct and optimal translation.

For example, a sentence can be "The firm was very firm with their rules." and the two words with the same spelling is "firm." A direct, verbatim translation into German, may read as "Die Firma war sehr firma mit ihren Regeln." In English, this use of work "firm" in German reads as "The company was very business with their rules." A relational analysis can discern the difference in context for the two instances of "firm" in the sentence. With this analysis, a more appropriate, contextually accurate translation is "Die Firma hielt sich sehr streng an ihre Regeln." which read as "The company was very strict about their rules." in English. Thus, the direct translation without context can result in an incorrect meaning.

In another example, a sentence is "The parking meter required a payment of one quarter, or twenty-five cents, for every quarter hour" and the two words with the same spelling is "quarter." In this example, without proper context, the word "quarter" might be misconstrued due to its dual usage in the sentence. Relational analysis can be used to distinguishing between the different uses of "quarter." The resulting translation is: "An der Parkuhr musste für jede Viertelstunde ein Viertel bzw. fünfundzwanzig Cent bezahlt werden." In this example the translation is correct using the word "viertel" for quarter to represent a fraction or portion of an hour rather than another meaning of quarter such as "Stadtviertel," which means neighborhood.

The process updates the translations based on the analysis of the relationships (step 614). The updates can include making changes based on context identified between elements in the virtual map.

The process updates the virtual map with the translated text (step 616). The process reconstructs the document using the translated elements maintaining original positions and styles (step 618). Next, the process displays the translated document (step 620) with the process terminating thereafter. In this example, the translated document can be displayed as a webpage in a browser or a page or screen in a mobile application.

Figure 7:
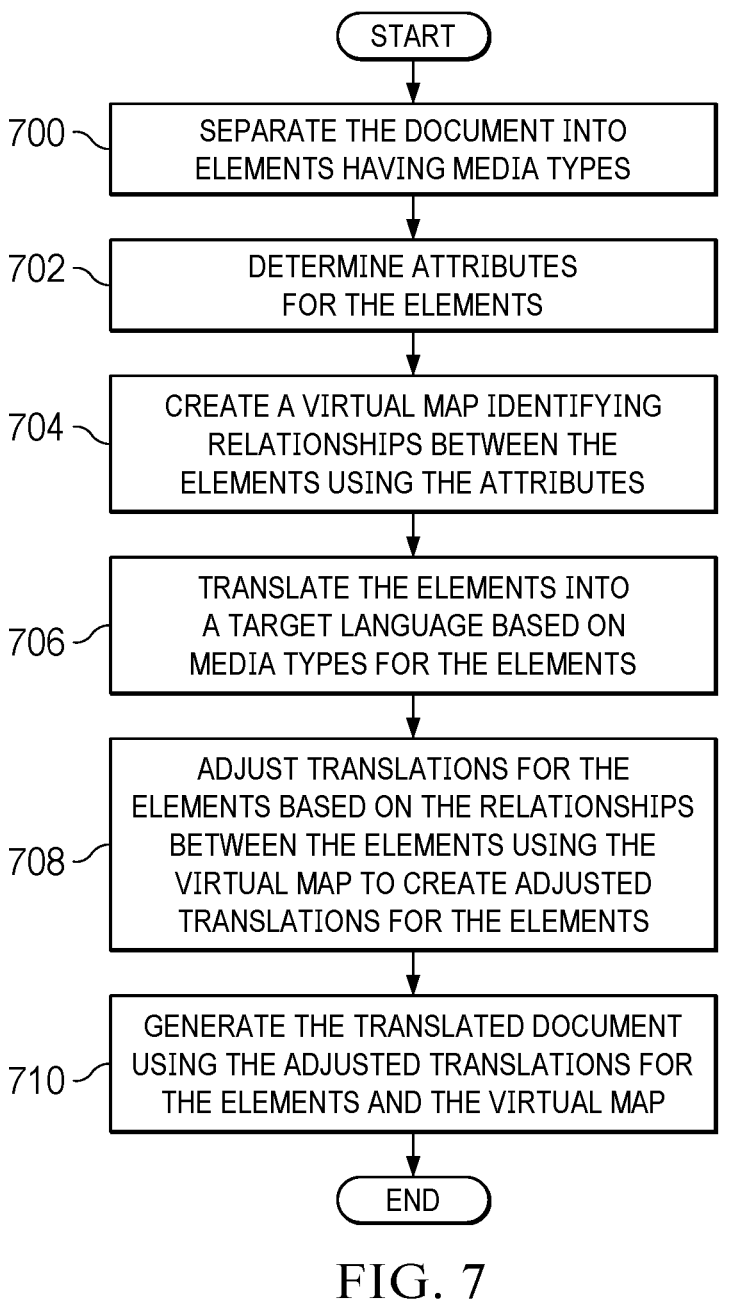
FIG. 7 is a flowchart of a process for translating a document in accordance with an illustrative embodiment.

Turning next to FIG. 7, a flowchart of a process for translating a document is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in document translator 214 in computer system 212 in FIG. 2.

The process begins by separating the document into elements having media types (step 700). The process determines attributes for the elements (step 702). The process creates a virtual map identifying relationships between the elements using the attributes (step 704).

The process translates the elements into a target language based on media types for the elements (step 706). The process adjusts translations for the elements based on the relationships between the elements using the virtual map to create adjusted translations for the elements (step 708).

The process generates the translated document using the adjusted translations for the elements and the virtual map (step 710). The process terminates thereafter.

Figure 8:
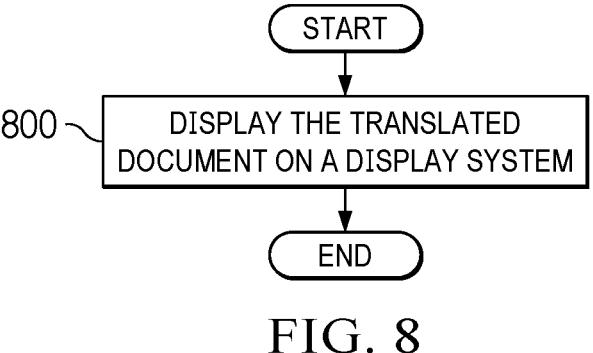
FIG. 8 is a flowchart of a process for displaying a translated document in accordance with an illustrative embodiment.

With reference now to FIG. 8, a flowchart of a process for displaying a translated document is depicted in accordance with an illustrative embodiment. The process in this figure is an example of an additional step that can be performed with the steps in FIG. 7.

The process displays the translated document on a display system (step 800). The process terminates thereafter.

Figure 9:
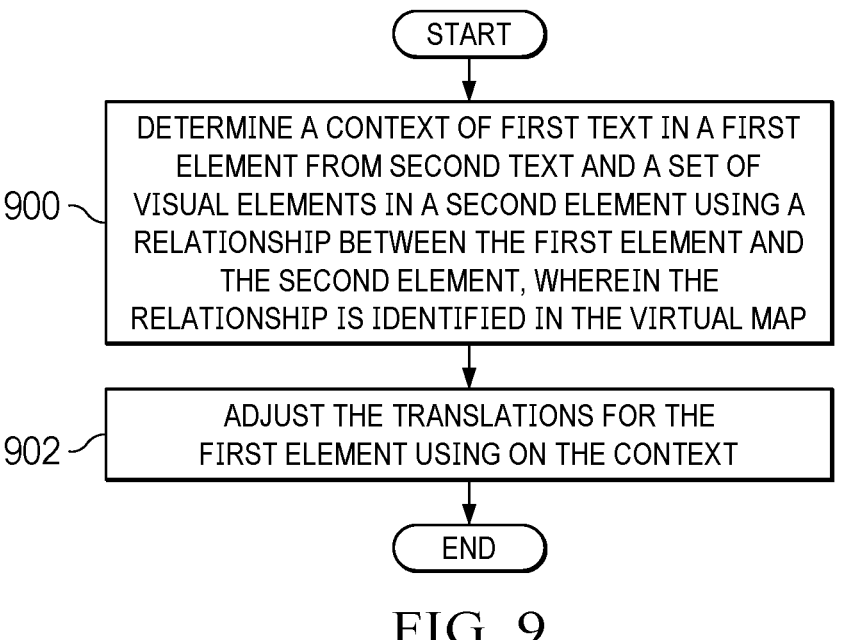
FIG. 9 is a flowchart of a process for adjusting translations of elements in accordance with an illustrative embodiment.

Next in FIG. 9, a flowchart of a process for adjusting translations of elements is depicted in accordance with an illustrative embodiment. The process illustrated in this figure is an example implementation of step 708 in FIG. 7.

The process determines a context of first text in a first element from second text and a set of visual elements in a second element using a relationship between the first element and the second element, wherein the relationship is identified in the virtual map (step 900). The process adjusts the translations for the first element using on the context (step 902). The process terminates thereafter.

For example, a text element can include the word "spring" and an image element can include the word "spring" and a visual element showing a coiled flexible mechanical device. In translating the text element into German, "spring" can be "frühling" or "feder". "Frühling" refers to a season between winter and summer and "feder" refers to a coiled flexible mechanical device that can absorb or release energy. The visual element provides context for selecting "feder" as the translated word for "spring" in this example. In this context to me identified through computer vision or object recognition analysis of the visual element.

Turning to FIG. 10, a flowchart of a process for translating a text element is depicted in accordance with an illustrative embodiment. The process in this figure is an example of an implementation for step 706 in FIG. 7.

The process begins by performing a direct dictionary translation of text in an element to create intermediate text (step 1000). The process performs a machine learning model analysis and natural language processing on the intermediate text to determine grammar and coherence of intermediate text in the target language (step 1002).

The process adjusts the grammar and coherence of the intermediate text using the machine learning model analysis to create a translation for the element (step 1004). The process terminates thereafter.

Figure 11:
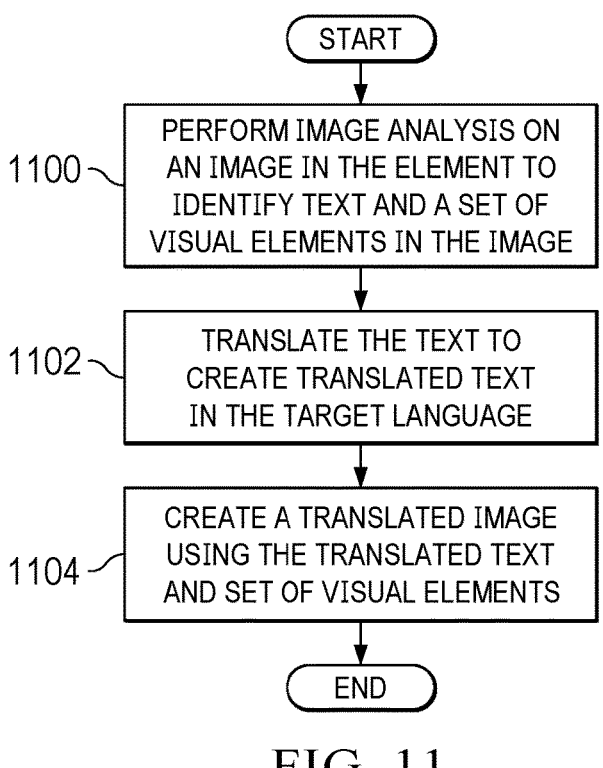
FIG. 11 is a flowchart of a process for translating an image element in accordance with an illustrative embodiment.

In FIG. 11, a flowchart of a process for translating an image element is depicted in accordance with an illustrative embodiment. The process in this figure is an example of an implementation for step 706 in FIG. 7.

The process begins by performing image analysis on an image in the element to identify text and a set of visual elements in the image (step 1100). The process translates the text to create translated text in the target language (step 1102).

The process creates a translated image using the using the translated text and set of visual elements (step 1104). The process terminates thereafter.

Figure 12:
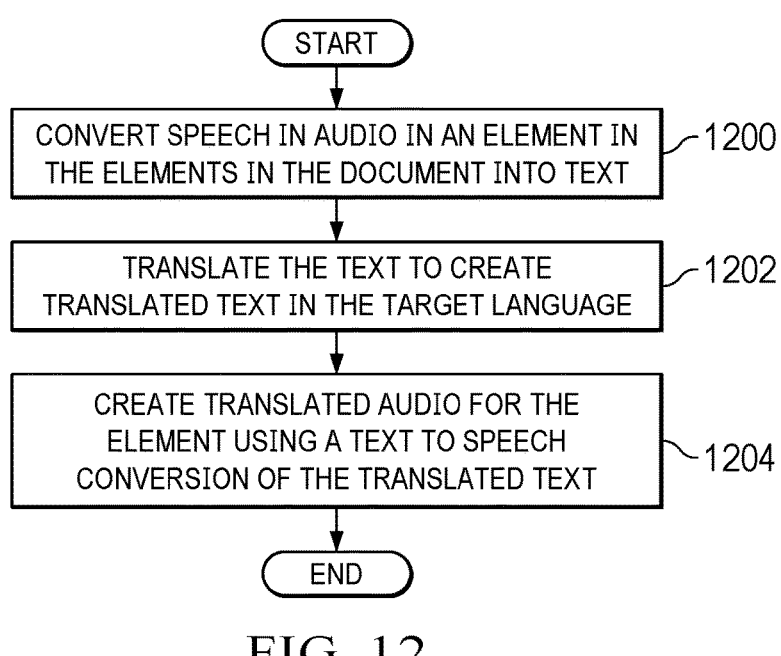
FIG. 12 is a flowchart of a process for translating an audio element in accordance with an illustrative embodiment.

With reference now to FIG. 12, a flowchart of a process for translating an audio element is depicted in accordance with an illustrative embodiment. The process in this figure is an example of an implementation for step 706 in FIG. 7.

The process converts speech in audio in an element in the elements in the document into text (step 1200). The process translates the text to create translated text in the target language (step 1202).

The process creates translated audio for the element using a text to speech conversion of the translated text (step 1204). The process terminates thereafter.

Figure 13:
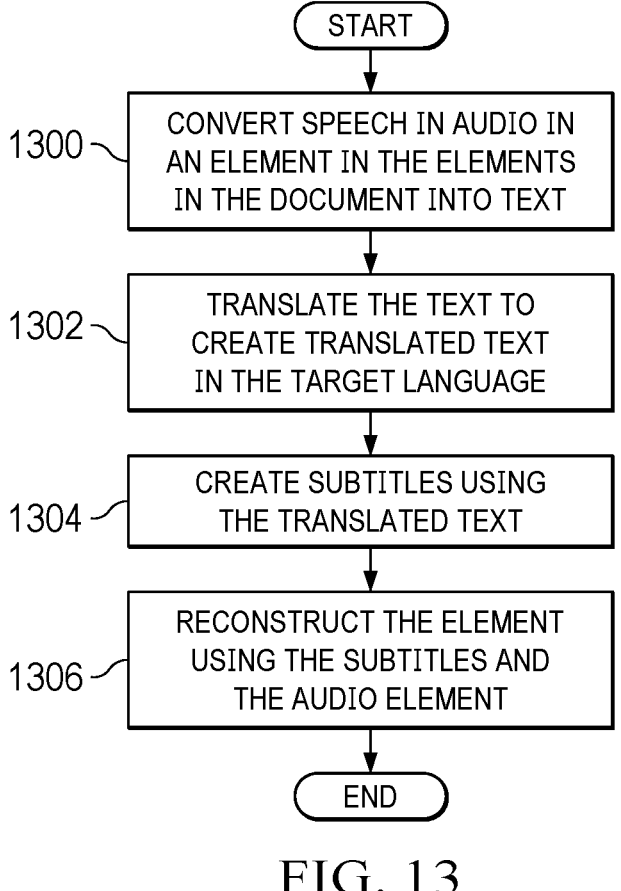
FIG. 13 is a flowchart of a process for translating an audio element in accordance with an illustrative embodiment.

Turning next to FIG. 13, a flowchart of a process for translating an audio element is depicted in accordance with an illustrative embodiment. The process in this figure is an example of an implementation for step 706 in FIG. 7. In this example, subtitles are generated for the audio.

The process begins by converting speech in audio in an element in the elements in the document into text (step 1300). The process translates the text to create translated text in the target language (step 1302). The process creates subtitles using the translated text (step 1304).

The process reconstructs the element using the subtitles and the audio element (step 1306). The process terminates thereafter.

Figure 14:
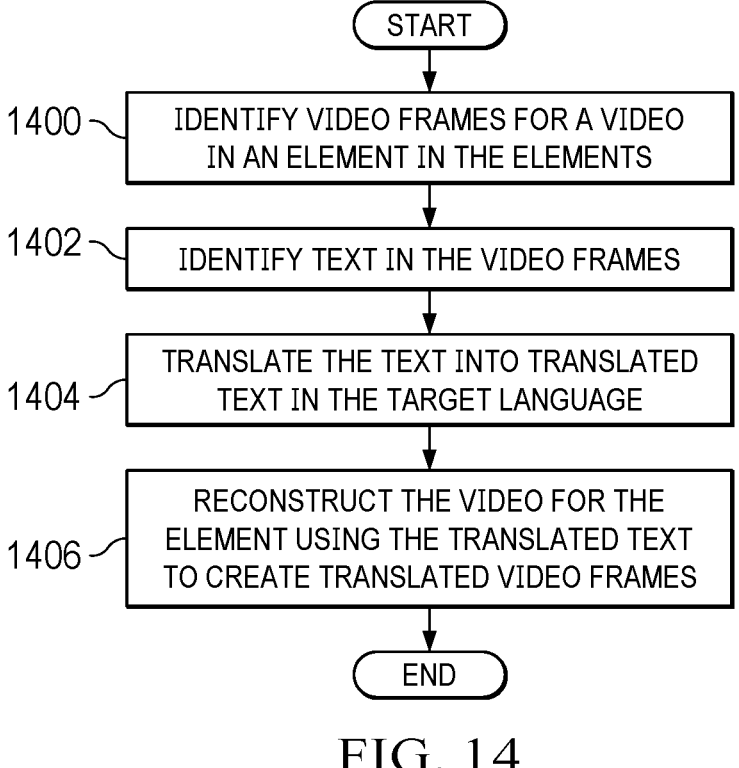
FIG. 14 is a flowchart of a process for translating an audio element in accordance with an illustrative embodiment.

Turning now to FIG. 14, a flowchart of a process for translating an audio element is depicted in accordance with an illustrative embodiment. The process in this figure is an example of an implementation for step 706 in FIG. 7.

The process begins by identifying video frames for a video in an element in the elements (step 1400). The process identifies text in the video frames (step 1402). The process translates the text into translated text in the target language (step 1404).

The process reconstructs the video for the element using the translated text to create a translated video frames (step 1406). The process terminates thereafter.

Figure 15:
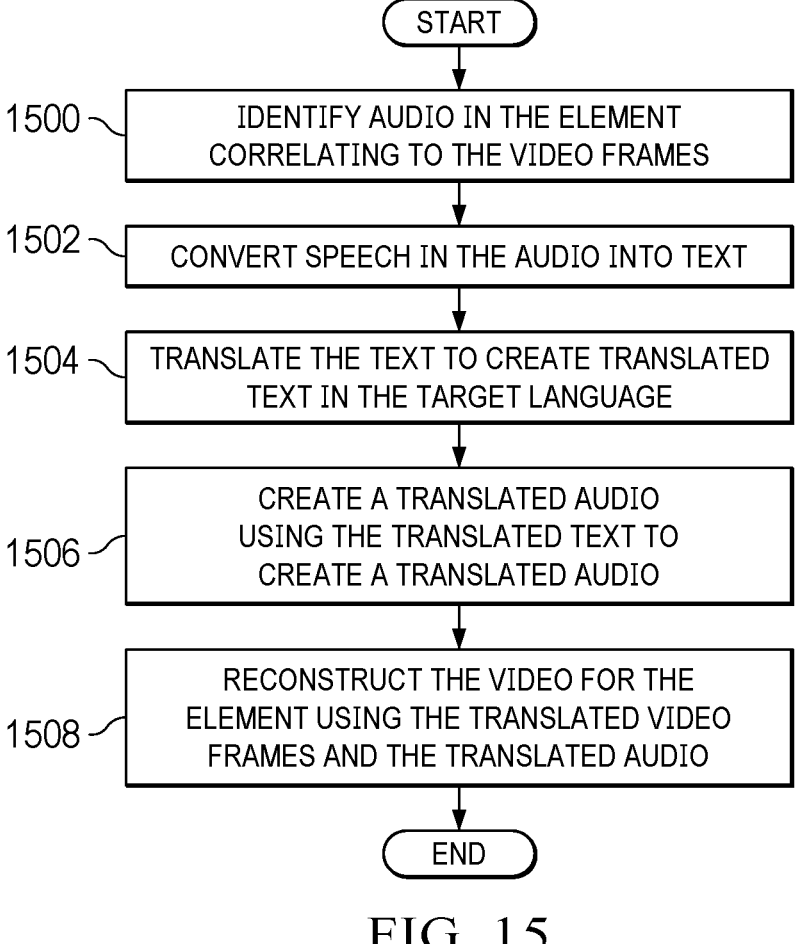
FIG. 15 is a flowchart of a process for translating a video element in accordance with an illustrative embodiment.

Next in FIG. 15, a flowchart of a process for translating a video element is depicted in accordance with an illustrative embodiment. The process in this figure is an example of additional steps that can be formed with the steps in FIG. 14. In this example, the video also include audio.

The process identifies audio in the element correlating to the video frames (step 1500). The process converts speech in the audio into text (step 1502).

The process translates the text to create translated text in the target language (step 1504). The process creates a translated audio using the translated text to create a translated audio (step 1506). This translated audio can include speech re-created in the target language. Additionally, the translated audio can also include subtitles in addition to or in place of the speech re-created in the target language.

The process reconstructs the video for the element using the translated video frames and the translated audio (step 1508). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 16:
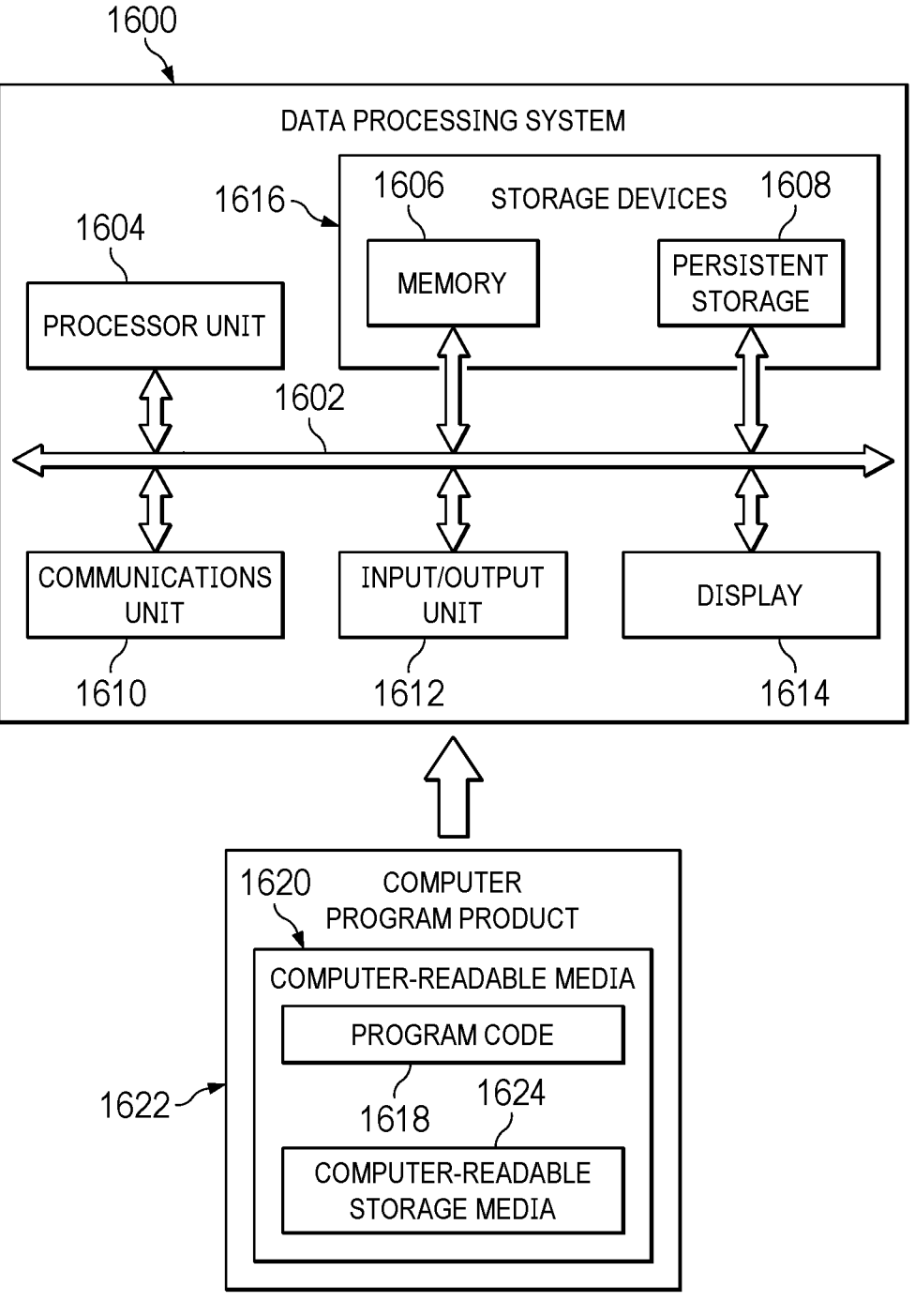
FIG. 16 is a block diagram of a data processing system in accordance with an illustrative embodiment.

Turning now to FIG. 16, a block diagram of a data processing system is depicted in accordance with an illustrative embodiment. Data processing system 1600 can be used to implement computers and computing devices in computing environment 100 in FIG. 1. Data processing system 1600 can also be used to implement computer system 212 in FIG. 2. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1616 may also be referred to as computer readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program instructions, computer usable program instructions, or computer readable program instructions that can be read and executed by a processor in processor unit 1604. The program instructions in the different embodiments can be embodied on different physical or computer readable storage media, such as memory 1606 or persistent storage 1608.

Program instructions 1618 are located in a functional form on computer readable media 1620 that is selectively removable and can be loaded onto or transferred to data processing system 1600 for execution by processor unit 1604. Program instructions 1618 and computer readable media 1620 form computer program product 1622 in these illustrative examples. In the illustrative example, computer readable media 1620 is computer readable storage media 1624.

Computer readable storage media 1624 is a physical or tangible storage device used to store program instructions 1618 rather than a medium that propagates or transmits program instructions 1618. Computer readable storage media 1624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1618 can be transferred to data processing system 1600 using a computer readable signal media. The computer readable signal media are signals and can be, for example, a propagated data signal containing program instructions 1618. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1620" can be singular or plural. For example, program instructions 1618 can be located in computer readable media 1620 in the form of a single storage device or system. In another example, program instructions 1618 can be located in computer readable media 1620 that is distributed in multiple data processing systems. In other words, some instructions in program instructions 1618 can be located in one data processing system while other instructions in program instructions 1618 can be located in one data processing system. For example, a portion of program instructions 1618 can be located in computer readable media 1620 in a server computer while another portion of program instructions 1618 can be located in computer readable media 1620 located in a set of client computers.

The different components illustrated for data processing system 1600 are not meant to provide architectural limitations to the manner in which different embodiments can be implemented. In some illustrative examples, one or more of the components may be incorporated in or otherwise form a portion of, another component. For example, memory 1606, or portions thereof, may be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program instructions 1618.

Thus, illustrative embodiments provide a computer implemented method, computer system, and computer program product for translating a document. In one illustrative example, a number of processor units separate the document into elements having media types. The number of processor units determine attributes for the elements. The number of processor units create a virtual map identifying relationships between the elements using the attributes. The number of processor units translate the elements into a target language based on media types for the elements. The number of processor units adjust translations for the elements based on the relationships between the elements using the virtual map to create adjusted translations for the elements. The number of processor units generate the translated document using the adjusted translations for the elements and the virtual map.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for simultaneously translating all media in a document, the computer implemented method comprising:

receiving, as a webpage or mobile application on a display system, the document comprising machine readable code corresponding to instructions and data performing computer operations specified in a given computer program product environment presenting media types in a first format incomprehensible to a user, the media types comprising: text in an image, audio, or video;

separating, by a number of processor units applying a machine learning model identifying context within each of the media types, the document into elements having the media types;

determining, by the number of processor units, attributes for the elements;

creating, by the number of processor units, a virtual map identifying relationships between the elements using the attributes, wherein the virtual map comprises formatting information associated with elements from the document for generating a translated document for the document;

subsequently translating, by the number of processor units applying: vision image analysis, speech to text audio translation, or video frames reconstruction, the elements in real time as the document displays on the display system into a target language based on media types for the elements;

adjusting, by the number of processor units, translations for the elements based on the relationships between the elements using the virtual map thereby creating, in real time as the document displays on the display system, adjusted translations for the elements;

generating, by the number of processor units reconstructing the machine readable code from the first format and using the adjusted translations for the elements and the virtual map, the translated document; and displaying the translated document in a second format comprehensible to the user on the display system.

2. The computer implemented method of claim 1 further comprising:

the document comprising at least one of: a webpage, a mobile application page, an application page, a slide deck, or a presentation; and displaying, by the number of processor units, the translated document on the display system with a font similar to a font in the first format.

3. The computer implemented method of claim 1, wherein adjusting, by the number of processor units, translations for the elements comprises:

determining, by the number of processor units, a context of first text in a first element from second text and a set of visual elements in a second element using a relationship between the first element and the second element, wherein the relationship is identified in the virtual map; and adjusting, by the number of processor units, the translations for the first element using the context.

4. The computer implemented method of claim 1, wherein translating, by the number of processor units, the elements comprises:

performing, by the number of processor units, a direct dictionary translation of text in an element to create intermediate text;

performing, by the number of processor units, a machine learning model analysis and natural language processing on the intermediate text to determine grammar and coherence of intermediate text in the target language; and adjusting, by the number of processor units, the grammar and coherence of the intermediate text using the machine learning model analysis to create a translation for the element.

5. The computer implemented method of claim 1, wherein translating, by the number of processor units, the elements comprises:

performing, by the number of processor units, image analysis on an image in an element to identify text and a set of visual elements in the image;

translating, by the number of processor units, the text to create translated text in the target language; and creating, by the number of processor units, a translated image using the using the translated text and set of visual elements.

6. The computer implemented method of claim 1, wherein translating, by the number of processor units, the elements comprises:

converting, by the number of processor units, speech in audio in an element in the elements in the document into text;

translating, by the number of processor units, the text to create translated text in the target language; and creating, by the number of processor units, translated audio for the element using a text to speech conversion of the translated text.

7. The computer implemented method of claim 1, wherein translating, by the number of processor units, the elements comprises:

converting, by the number of processor units, speech in audio in an element in the elements in the document into text;

translating, by the number of processor units, the text to create translated text in the target language;

creating, by the number of processor units, subtitles using the translated text; and reconstructing, by the number of processor units, the element using the subtitles and the audio.

8. The computer implemented method of claim 1, wherein translating, by the number of processor units, the elements comprises:

identifying, by the number of processor units, video frames for a video in an element in the elements;

identifying, by the number of processor units, text in the video frames;

translating, by the number of processor units, the text into translated text in the target language; and reconstructing, by the number of processor units, the video for the element using the translated text to create a translated video frames.

9. The computer implemented method of claim 8, wherein translating, by the number of processor units, the elements further comprises:

identifying, by the number of processor units, audio in the element correlating to the video frames;

converting, by the number of processor units, speech in the audio into text;

translating, by the number of processor units, the text to create translated text in the target language;

creating, by the number of processor units, a translated audio using the translated text to create a translated audio; and reconstructing, by the number of processor units, the video for the element using the translated video frames and the translated audio.

10. A computer system that comprises:

a number of processor units, wherein the number of processor units are configured to execute program instructions to:

receive a document as a webpage or mobile application on a display system, wherein the document comprises machine readable code that corresponds to instructions and data configured to perform computer operations specified in a given computer program product environment that presents media types in a first format incomprehensible to a user, wherein the media types comprise: text in an image, audio, or video;

separate, based upon application of a machine learning model configured to identify context within each of the media types, a document into elements that comprise the media types;

determine attributes for the elements;

create a virtual map that identifies relationships between the elements using the attributes, wherein the virtual map comprises formatting information associated with elements from the document for generating a translated document for the document;

subsequently, translate, based upon application of: vision image analysis, speech to text audio translation, or video frames reconstruction, the elements in real time as document displays on the display system into a target language based on media types for the elements;

adjust translations for the elements based on the relationships between the elements using the virtual map to create, in real time as document displays on the display system, adjusted translations for the elements;

reconstruct, based upon the virtual map and the adjusted translations, the machine readable code from the first format to generate the translated document; and display the translated document in a second format comprehensible to the user on the display system.

11. The computer system of claim 10, wherein the number of processor units further execute the program instructions to:

display the translated document on the display system with a font similar to a font in the first format.

12. The computer system of claim 10, wherein as part of adjusting the translations for the elements, the number of processor units further execute the program instructions to:

determine a context of first text in a first element from second text and a set of visual elements in a second element using a relationship between the first element and the second element, wherein the relationship is identified in the virtual map; and adjust the translations for the first element using the context.

13. The computer system of claim 10, wherein as part of translating the elements, the number of processor units further execute the program instructions to:

perform a direct dictionary translation of text in an element to create intermediate text;

perform a machine learning model analysis and natural language processing on the intermediate text to determine grammar and coherence of intermediate text in the target language; and adjust the grammar and coherence of the intermediate text using the machine learning model analysis to create a translation for the element.

14. The computer system of claim 10, wherein as part of translating the elements, the number of processor units further execute the program instructions to:

perform image analysis on an image in an element to identify text and a set of visual elements in the image;

translate the text to create translated text in the target language; and create a translated image using the using the translated text and set of visual elements.

15. The computer system of claim 10, wherein as part of translating the elements, the number of processor units further execute the program instructions to:

convert speech in audio in an element in the elements in the document into text;

translate the text to create translated text in the target language; and create translated audio for the element using a text to speech conversion of the translated text.

16. The computer system of claim 10, wherein as part of translating the elements, the number of processor units further execute the program instructions to:

convert speech in audio in an element in the elements in the document into text;

translate the text to create translated text in the target language;

create subtitles using the translated text; and reconstruct the element using the subtitles and the audio in the element.

17. The computer system of claim 10, wherein as part of translating the elements, the number of processor units further execute the program instructions to:

identify video frames for a video in an element in the elements;

identify text in the video frames;

translate the text into translated text in the target language; and reconstructing, by the number of processor units, the video for the element using the translated text to create a translated video frames.

18. The computer system of claim 17, wherein as part of translating the elements, the number of processor units further execute the program instructions to:

identify audio in the element correlating to the video frames;

convert speech in the audio into text;

translate the text to create translated text in the target language;

create a translated audio using the translated text to create a translated audio; and reconstruct the video for the element using the translated video frames and the translated audio.

19. A computer program product configured to translate a document, wherein the computer program product comprises a computer readable storage medium that comprises program instructions configured to cause a computer system to:

receive a document as a webpage or mobile application on a display system, wherein the document comprises machine readable code that corresponds to instructions and data configured to perform computer operations specified in a given computer program product environment that presents media types in a first format incomprehensible to a user, wherein the media types comprise: text in an image, audio, or video;

separate, based upon application of a machine learning model configured to identify context within each of the media types, a document into elements having that comprise the media types;

determine attributes for the elements;

create a virtual map that identifies relationships between the elements using the attributes, wherein the virtual map comprises formatting information associated with elements from the document for generating a translated document for the document;

subsequently, translate, based upon application of: vision image analysis, speech to text audio translation, or video frames reconstruction, the elements in real time as document displays on the display system into a target language based on media types for the elements;

adjust translations for the elements based on the relationships between the elements using the virtual map to create, in real time as document displays on the display system, adjusted translations for the elements;

reconstruct, based upon the virtual map and the adjusted translations, the machine readable code from the first format to generate the translated document; and display the translated document in a second format comprehensible to the user on the display system.

20. The computer program product of claim 19, wherein as part of adjusting translations for the elements, the program instructions are executable by the computer system further cause the computer system to:

determine a context of first text in a first element from second text and a set of visual elements in a second element using a relationship between the first element and the second element, wherein the relationship is identified in the virtual map; and adjust the translations for the first element using the context.

\* \* \* \* \*